(12) United States Patent
Hardeman et al.

(10) Patent No.: US 7,774,222 B2
(45) Date of Patent: Aug. 10, 2010

(54) SYSTEM FOR MANAGING BUSINESS PROCESSES THROUGH A PLURALITY OF DISTINCT INPUT CHANNELS

(75) Inventors: Anthonie Hardeman, Almere (NL); Lorenzo Lasisi Van der Wolf, Purmerend (NL); Johannes Miedema, Apeldoorn (NL); Erik De Ruijter, Amsterdam (NL); Marcellinus Gerardus Molenaar, Ijmuiden (NL); Cornelis Hendricus Dusink, Diemen (NL); Wouter Johan Michèl Schmitz, Amsterdam (NL)

(73) Assignee: ABN AMRO Bank N.V. (NL)

( * ) Notice: Subject to any disclaimer, the term of this patent is extended or adjusted under 35 U.S.C. 154(b) by 1439 days.

(21) Appl. No.: 10/938,223

(22) Filed: Sep. 9, 2004

(65) Prior Publication Data

US 2006/0015385 A1 Jan. 19, 2006

(30) Foreign Application Priority Data

Jun. 17, 2004 (EP) .................................. 04102789

(51) Int. Cl.
G06Q 40/00 (2006.01)
G06F 9/50 (2006.01)

(52) U.S. Cl. ...................... 705/8; 705/1; 705/7; 705/35; 370/354; 717/102

(58) Field of Classification Search ...................... 705/1, 705/7, 8, 35; 717/102; 370/354
See application file for complete search history.

(56) References Cited

U.S. PATENT DOCUMENTS 5,933,816 A * 8/1999 Zeanah et al. .................. 705/35
6,012,050 A * 1/2000 Eaton et al. .................... 705/42
6,535,855 B1 * 3/2003 Cahill et al. .................. 705/1.1
7,502,752 B1 * 3/2009 Lemons et al. ................ 705/35

(Continued)

FOREIGN PATENT DOCUMENTS

WO WO-9510906 4/1995

(Continued)

OTHER PUBLICATIONS de Putte et al., AIM Architecture for Financial Services, IBM Redbooks, Feb. 2002, p. 1-96.*

(Continued)

*Primary Examiner*—Andre Boyce
*Assistant Examiner*—Justin M Pats
(74) *Attorney, Agent, or Firm*—Schwegman, Lundberg & Woessner, P.A.

(57) ABSTRACT

A system is described for managing business processes through a plurality of distinct input channels, wherein the processes have a number of consecutive process phases. The system comprises a process management module which is configured to receive requests from a customer through any one of the input channels and to execute on the basis of these requests a business process. The system uses a process definition database for storing process definitions of each of the business processes and the process phases used therein. An interface module handles the communication between the input channels and the process management module, wherein a session service in the interface module stores session information about a particular one of the plurality of input channels through which a given request for executing a process phase was received.

13 Claims, 12 Drawing Sheets

U.S. PATENT DOCUMENTS

2003/0187743 A1* 10/2003 Kumaran et al. .............. 705/26

FOREIGN PATENT DOCUMENTS

WO        WO 02/23877 A2     3/2002

OTHER PUBLICATIONS

Boston Consulting Group, Activate and Integrate: Optimizing the Value of Online banking, bcg.com, Jan. 2002, p. 1-11.*

Briggs, The Real Time Enterprise: Unleashing the Power, Nov. 8, 2002, p. 1-15.*

Jacob et al., Linux and Branch Banking, IBM Redbooks, Dec. 2002, p. 1-156.*

S1 Branch Automation, s1.com., Jun. 5, 2004, retrieved from web.archive.org, 1 pg.*

S1 Full-Service Banking Solutions, s1.com., Jun. 5, 2004, retrieved from web.archive.org, p. 1-2 [Full Service Banking Solutions].*

"European Search Report for Corresponding European Patent Application EP 04102789", (Jan. 7, 2005), 3 pgs.

Jacob, B., et al., "Linux and Branch Banking", *IBM Redbooks*, http://www.redbooks.ibm.com/redbooks/pdfs/sg24909.pdf,(2002), 174 pgs.

Van De Putte, G., "AIM Architecture for Financial Services", *IBM Redbooks*, http://www.redbooks.ibm.com/redbooks/pdfs/redp0167.pdf,(2002), 111 pgs.

* cited by examiner

US 7,774,222 B2

SYSTEM FOR MANAGING BUSINESS PROCESSES THROUGH A PLURALITY OF DISTINCT INPUT CHANNELS

CLAIM OF PRIORITY

The present patent application claims the priority benefit of the filing date of European Application (EPO) No. 04102789.7.3 filed Jun. 17, 2004, which is incorporated herein by reference.

BACKGROUND OF THE INVENTION

An embodiment of the invention relates to a system for managing business processes by means of a computer system, said processes having a number of consecutive process phases, wherein one or more of said processes can be started and accessed through a plurality of input channels.

Systems for managing business processes by means of a computer system are known. WO-A-0223877 discloses for example an integrated work management engine for customer care in a communication system, which accepts work through multiple access channels. With an increasing range of services offered to customers there exists a need for an efficient system for managing processes supporting such services allowing access to a selected process via different channels throughout the process at the choice of the customer. It is a disadvantage of existing systems of this type, such as workflow systems, that it is not possible to interrupt a process started by a customer through a first input channel and to resume the process at a time chosen by the customer through a different channel chosen by the customer. Moreover, prior art systems based on a push mechanism can not handle processes including external process phases, such as process phases depending on actions of the customers involved.

An embodiment of the invention aims to provide a system of the above-mentioned type wherein the disadvantages of the prior art systems are overcome.

SUMMARY OF THE INVENTION

According to the invention a system for managing a number of business processes comprises a process management module which can be started upon receipt of a request for a predetermined business process from each input channel, a process definition database comprising process definitions of each of said number of processes, each process definition describing the process phases and order of process phases to be executed to complete the process, and an interface module handling communication between the input channels and the process management module, wherein the process management module comprises a control point handler, a case database for storing the status of each process managed by the system, and an entry database for storing data gathered during execution of the process, wherein upon receipt of a request for a predetermined process from an input channel the control point handler is started to retrieve information on a first or next process phase of said predetermined process from the process definition database and to start the prosecution of the retrieved process phase, wherein data entered during prosecution of a process phase is stored in the entry database and data stored in the entry database which is to be used during execution of a retrieved process step, is retrieved from the entry database, wherein after completion of the prosecution of each process phase the control of the process is returned to the control point handler, wherein after return of the control of the process, the control point handler updates the status of the respective process in the case database, wherein information on a next process phase of the same process is retrieved from the process definition database and prosecution thereof is started by the control point handler if a continuation request is received from the input channel, and wherein the control point handler returns control to the interface module if a stop request is received from the input channel.

In this manner a system for managing business processes is obtained, wherein the process management module, in particular the control point handler, allows customers to access, stop and resume any business process via an input channel at the choice of the customer. The process can be stopped after each process phase by the customer and it is the customer who decides at which moment he wishes to resume the process to continue with a next process phase. After completion of each process phase, the system allows the customer to decide to wait with the continuation of the process. As the status of each process is stored in the case database and all data gathered during execution of process phases is stored in the entry database all information needed to continue with a next process phase is centrally available in the process management module so that the customer may choose any input channel to continue with a next process phase.

New business processes can easily be added to the system by storing the process definition in the process definition database.

BRIEF DESCRIPTION OF THE DRAWINGS

The invention will be further described by reference to the drawings in which an embodiment of the system of the invention is shown in a very schematical way.

DETAILED DESCRIPTION OF THE PREFERRED EMBODIMENTS

Figure 1:
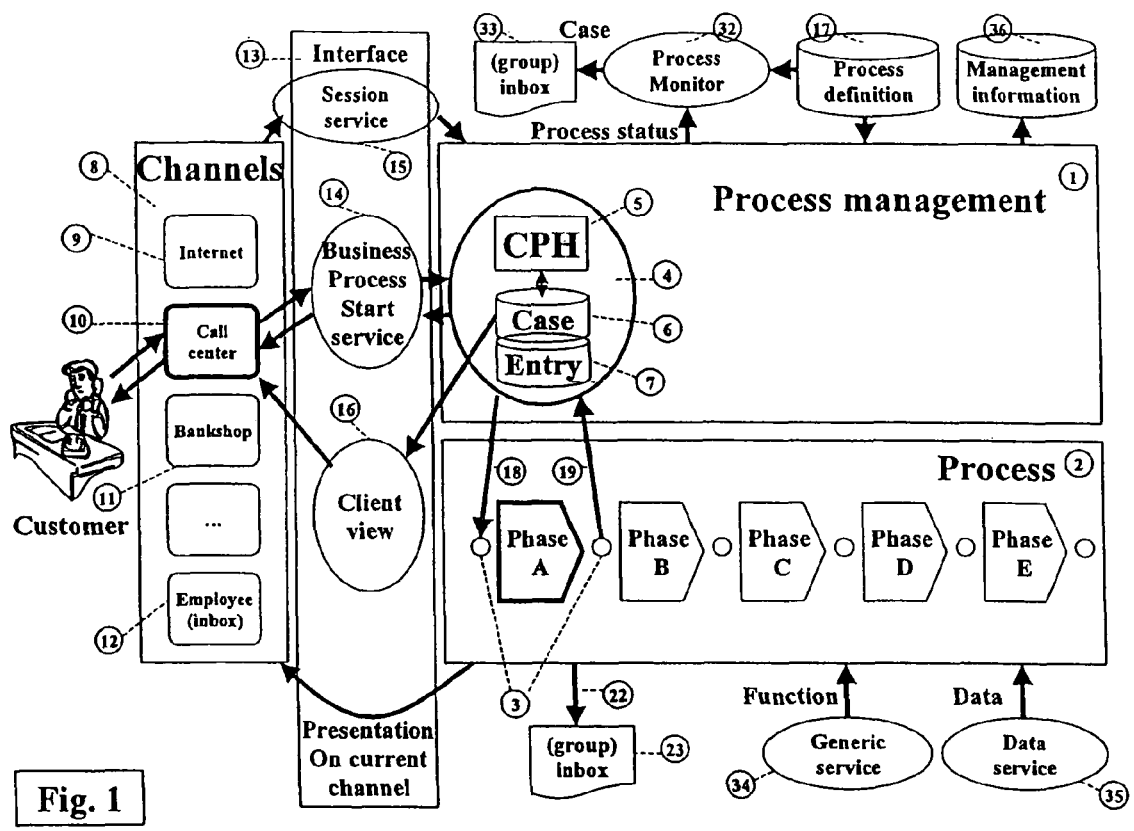
FIG. 1 shows a schematic diagram of an embodiment of the system for managing a number of business processes according to the invention.

FIG. 1 shows an overview of a system for managing a number of business processes by means of a computer system 1 not shown in detail. The computer system 1 may comprise a central main frame computer and a number of computer terminals, PC's and databases interconnected in a LAN and/or WAN. By way of example FIG. 1 shows a business process 2 comprising five process phases A-E, wherein so-called control points 3 are indicated as start and end points of each process phase A-E.

A central part of the system described is a process management module 4 which comprises a control point handler 5, a case database 6 and an entry database 7. In the case database 6 the status of each process managed by the system is stored and in the entry database 7 data gathered during execution of process phases is stored. This means that all information needed to continue with a next process phase is centrally available in the process management module 4. By way of example FIG. 1 shows a number of input channels 8, such as the internet 9, a call centre 10, a bank shop 11 and an employee terminal 12. It will be clear that in practice may employee terminals can be part of the system as input channel. The process management module 4 can be reached from any input channel 8 through an interface module 13, so that all information needed to continue with a process is centrally available for all input channels 8. The interface module 13 comprises a so-called business process start service 14, a session service 15 and a client view function 16.

The system described further comprises a process definition database 17 comprising the process definitions of the business processes which can be managed by the system. Each process definition comprises information with respect to the business process, such as information with respect to the process phases and the order in which the process phases are to be executed to complete the business process.

Figure 2:
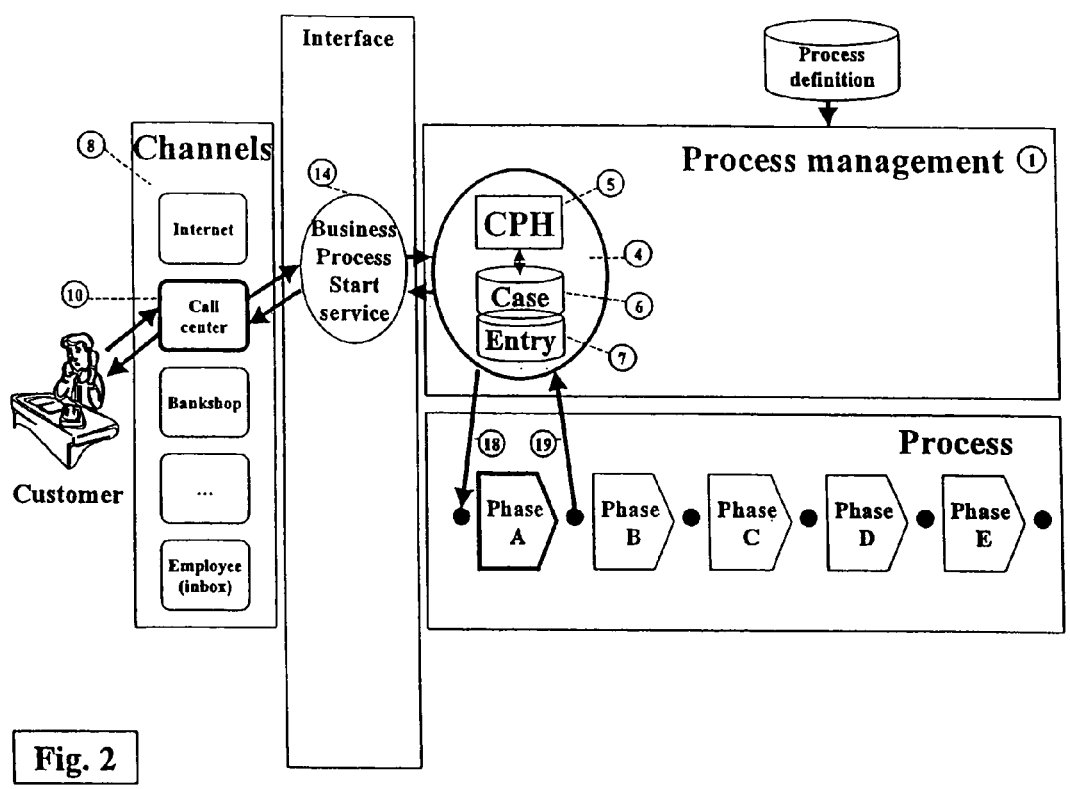
FIGS. 2-12 schematically show the operation of the system in managing a series of process phases of an example of a business process.

The operation of the system and further details of the system will be described by reference to FIGS. 2-12, showing as an example the manner in which a business process "sell a non-standard credit" is managed by the system. As schematically shown in FIG. 2 a customer calls the call centre 10 and tells the call centre agent that he wishes a non-standard credit. The call centre agent using his computer as part of the input channel 10, clicks on the computer screen the option "sell a non-standard credit". By clicking this option, the business process start service 14 of the interface module 13 starts up the process management module 4, in particular the control point handler 5. The control point handler 5 upon receipt of the request for the process "sell a non-standard credit", calls the process definition database 17 to retrieve the information on the first process phase of the process "sell a non-standard credit". With this information the control point handler 5 starts the prosecution of the first process phase A as indicated by arrow 18 in FIG. 2. Starting the process phase A means that an application program is executed to go through the steps necessary to finish this process phase A, so that control of the process is handed from the control point handler 5 to the process phase as indicated by arrow 18 in FIG. 2. These steps can be executed fully automatically, manually, partly manually, or may include a complicated workflow as will be described later. During the process phase a number of screens can be presented on the screen of the input channel used.

It is noted that through the session service 15, the process management module 4 receives information on the input channel 8, in this case input channel 10, through which the process has been accessed. This information includes information regarding the language used by the input channel, the location of the input channel computer, the platform on which the computer operates, etc. This information is used by the process management module 4 to start the correct implementation of the first process phase A. Moreover, this allows the process management module 4 to take care that any dialogues in the first process phase A are presented on the current input channel 10.

After completion of the first process phase A, the control of the process "sell a nonstandard credit" is returned to the control point handler 5 which updates the status of this particular process in the case database 6. Any relevant information that is entered by the call centre agent is stored in the entry database 7 during prosecution of process phase A. The status of this particular process becomes "process phase A is completed". Assuming that at the end of the first process phase A, the customer and the call centre agent agree to continue the process, the call centre agent clicks on the option "OK and continue" presented in the last screen of process phase A. This last screen also provides the option "OK and stop" as will be explained hereinafter. In case the option "OK and continue" is chosen, the control is returned from the process phase A to the control point handler 5 as shown by arrow 19 in FIG. 2 and upon receipt of this command, the control point handler 5, after updating the case database 6, calls the process definition database 17 to obtain information on the next process phase B.

Figure 3:
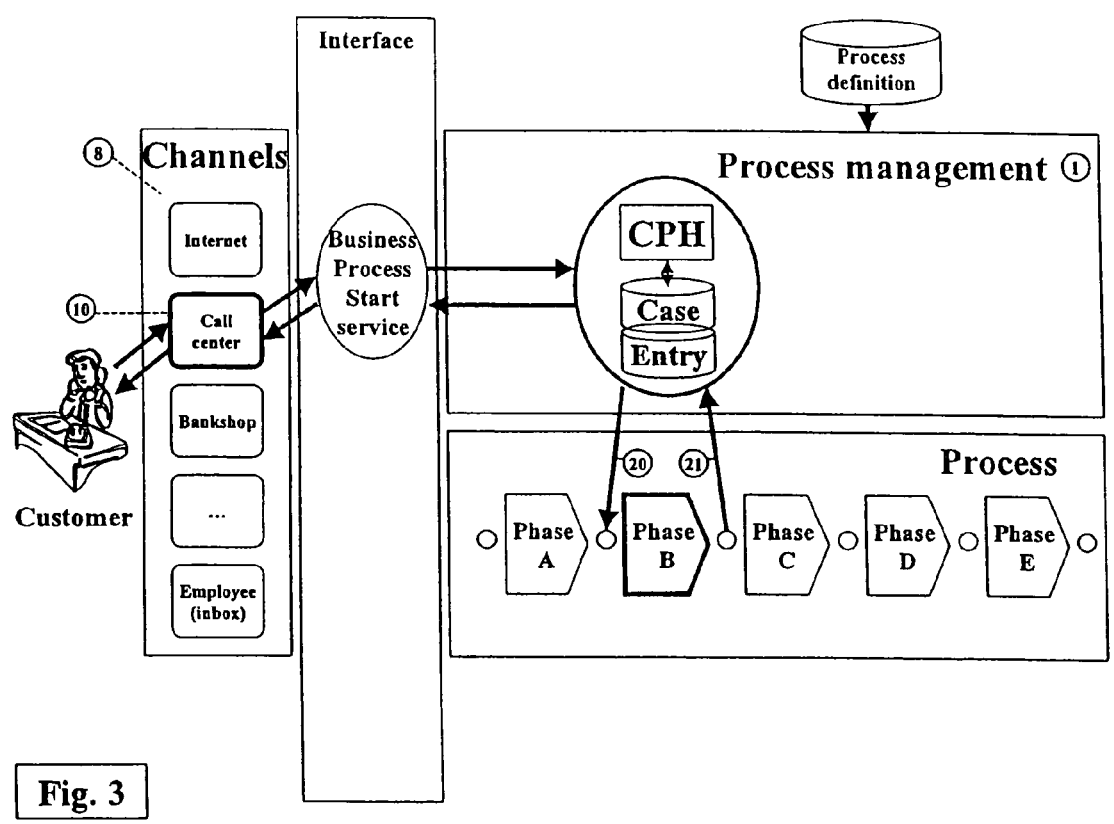
Figure 4:
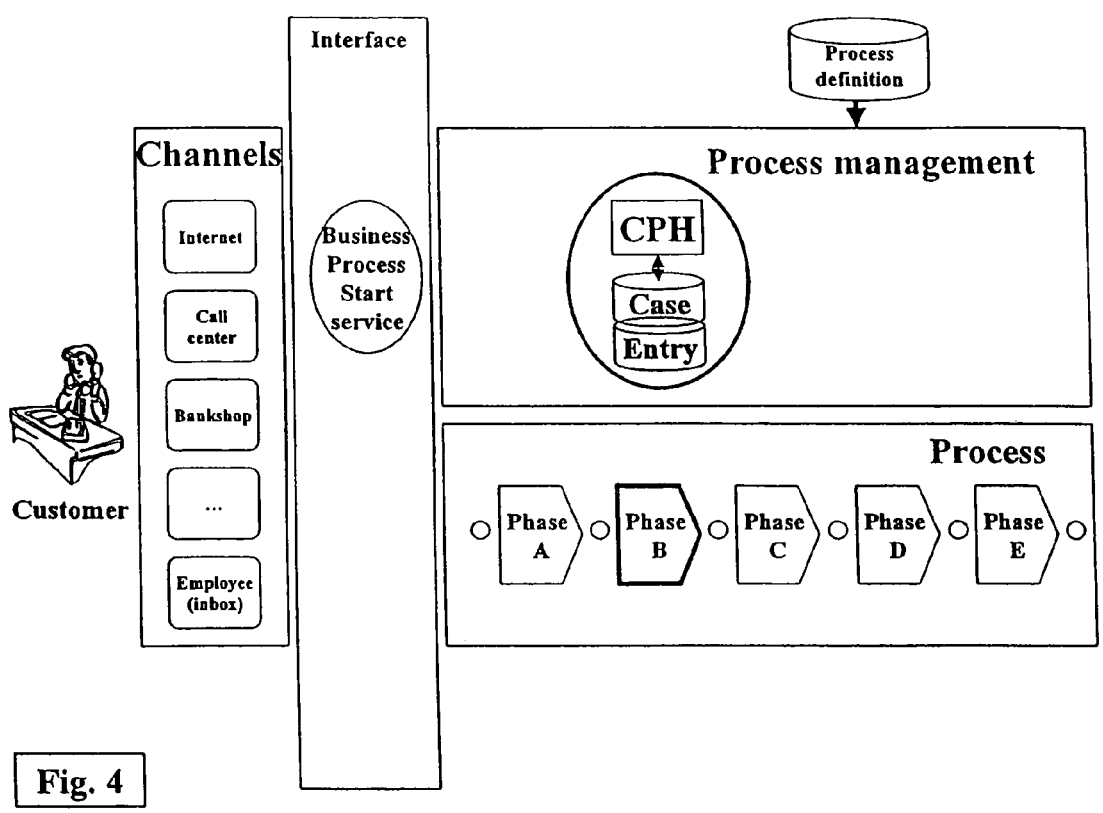
Figure 5:
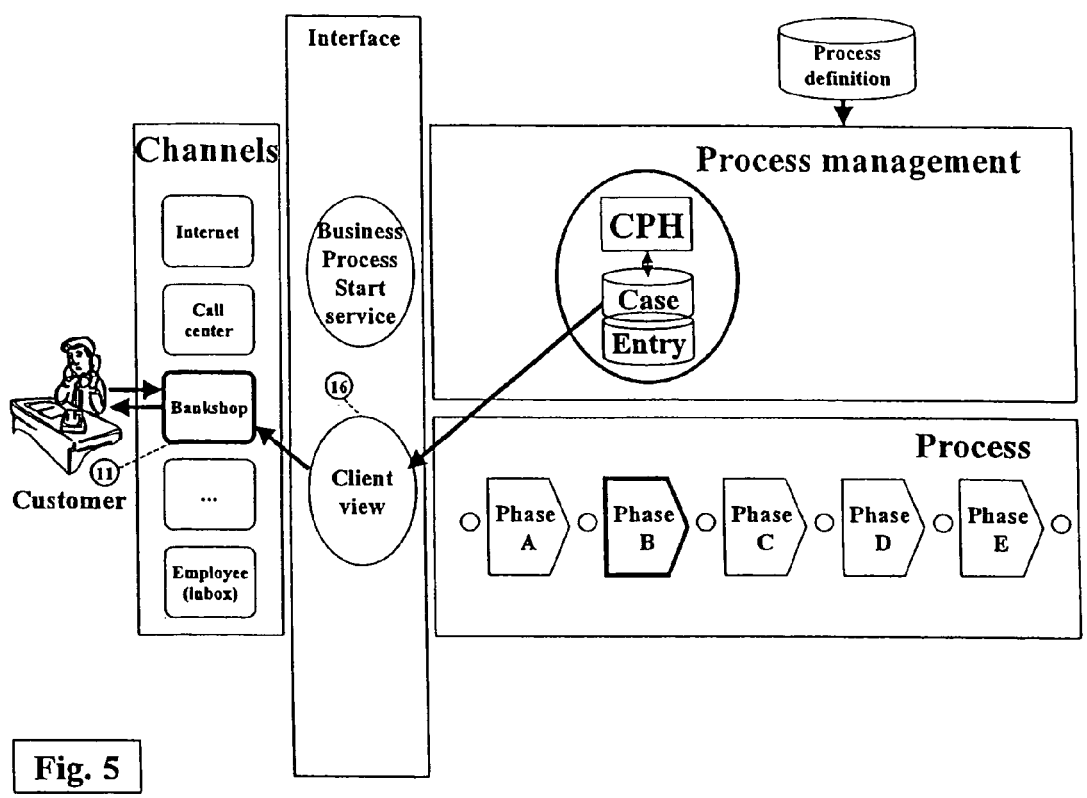
Figure 6:
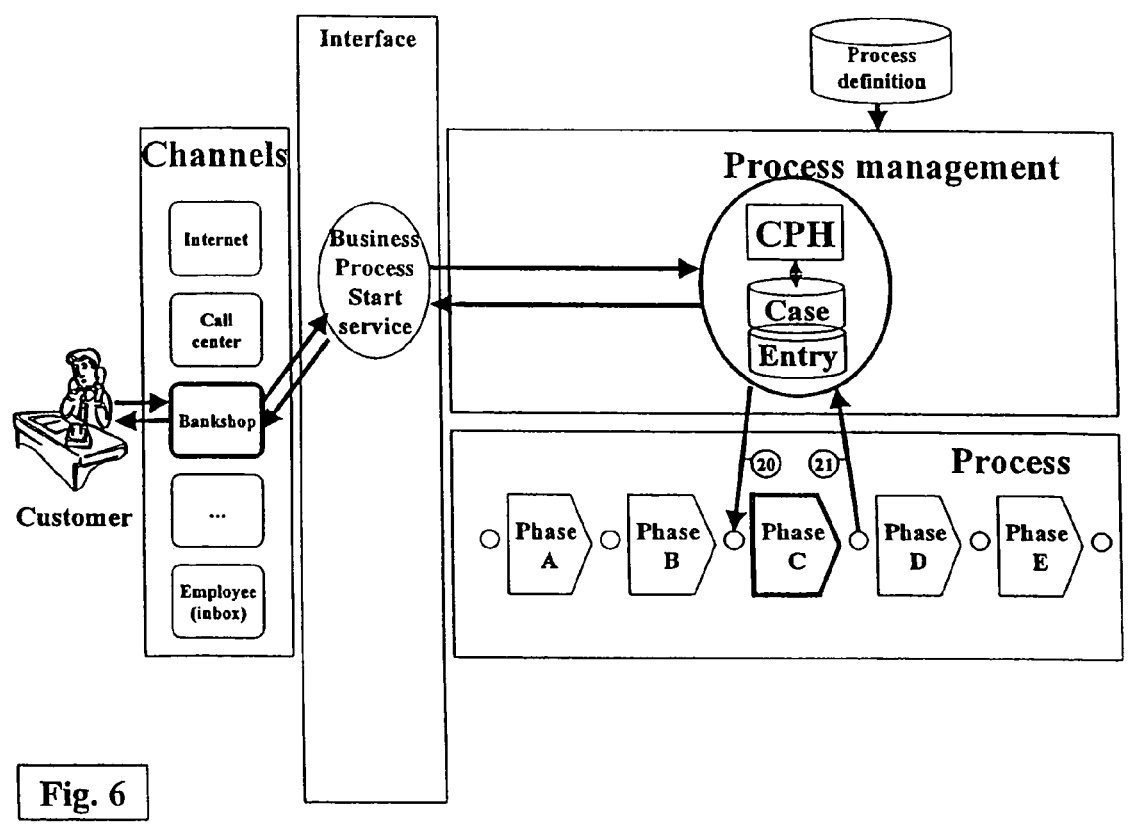

With this information the next process phase B is started as indicated by the arrow 20 in FIG. 3. When the second process phase B is completed, the control is returned to the control point handler 5 as indicated by arrow 21. However, in this case, the customer informed the call centre agent that he wants to think about the product offered and the information he has received so far. Therefore, the call centre agent clicks in the last screen of process phase B on the option "OK and stop". At the receipt of this code from the process phase B, the control point handler 5 updates the case database 6, and returns control of the process to the interface module 13, in particular the session service thereof, and the process stops as schematically indicated in FIG. 4. The information gathered during process phase B has been logged in the entry database 7, so that this information is centrally available.

In the example shown in FIGS. 2-12, the customer then decides to continue the process "sell a non-standard credit" in a bank shop, where the computer of the bank shop agent is part of the bank shop as input channel 11. According to FIG. 5, the bank shop agent clicks on the client view function 16 of the interface module 13 and this function presents all information of the customer including the cases stored in the case database 6 as being open for this customer. These cases include the case "sell a non-standard credit" which according to the information presented in the client view function 16 was started through the call centre input channel 10. By clicking on this particular case, the business process start service 14 starts the control point handler 5 to continue the case with the next process phase C. The control point handler 5 checks the status of the process in the case database 6 and calls the process definition database 17 to obtain information on the next process phase C. Thereafter the control point handler 5 starts process phase C as indicated by arrows 20, 21 in FIG. 6.

Figure 7:
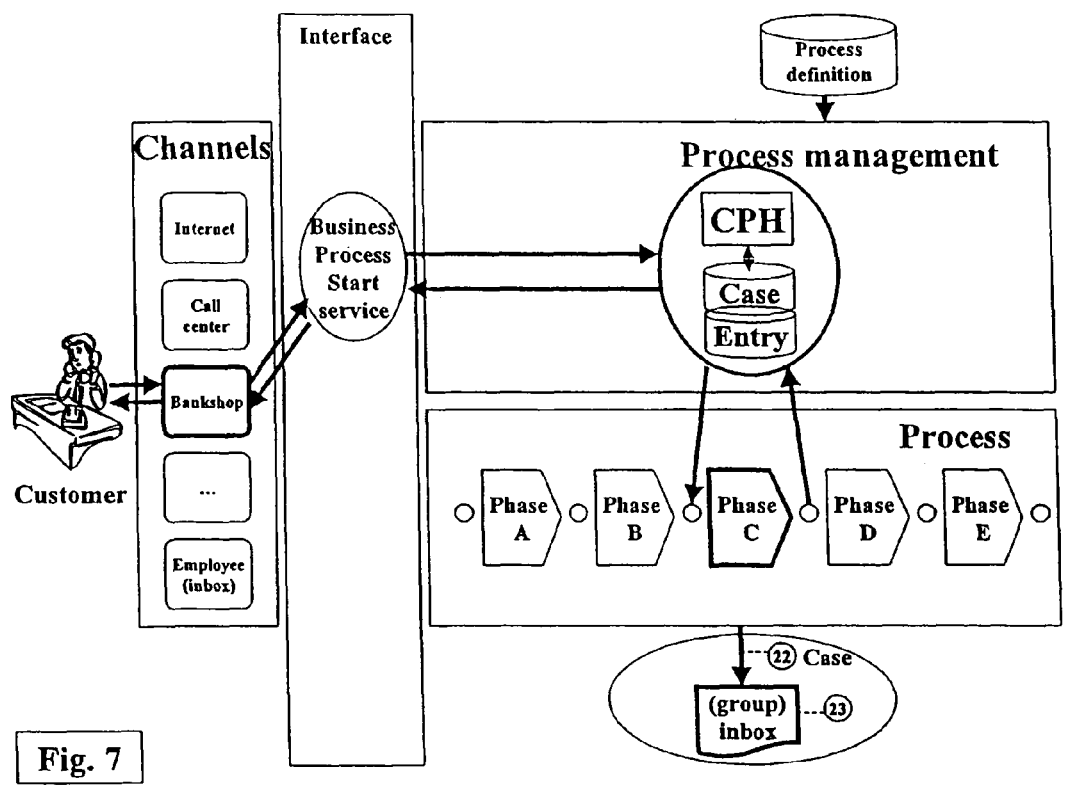
Figure 8:
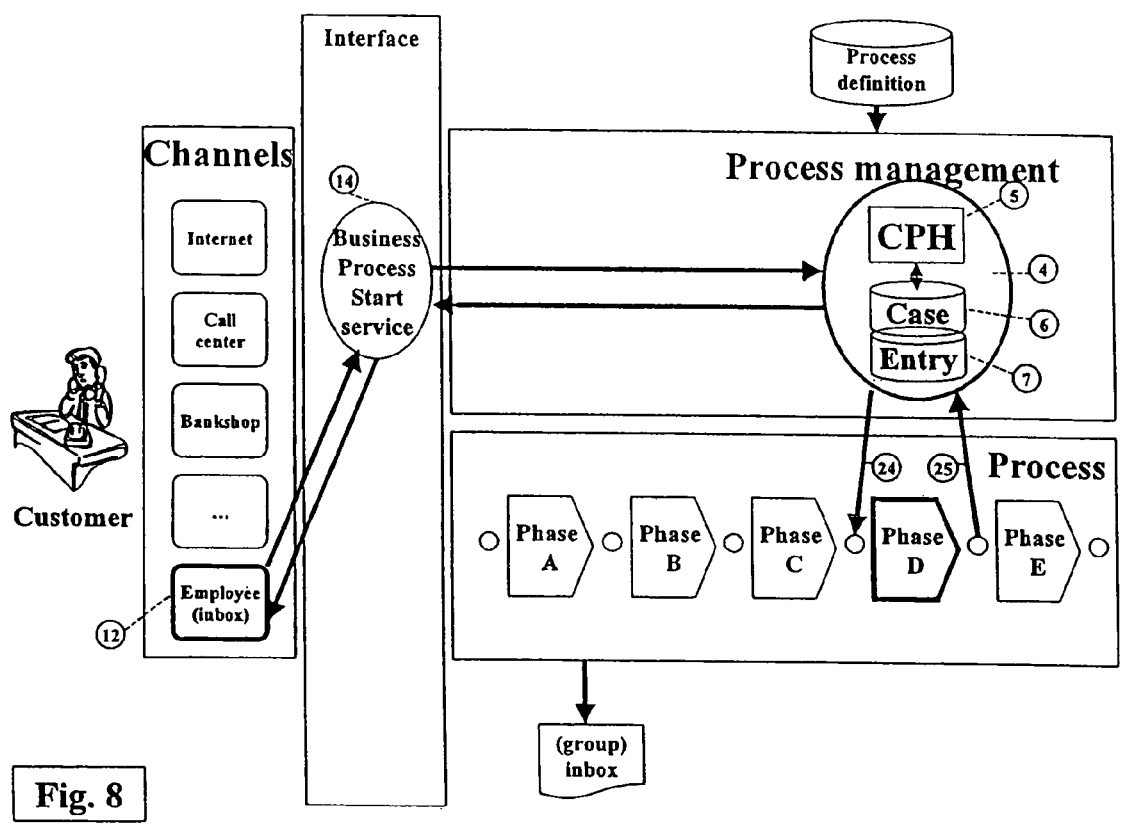

The business process "sell a non-standard credit" is an example of a process which includes a process phase in which internal specialists have to work on the product. During process phase C, the bank shop agent gathers all information from the customer which is needed in the next process phase D to allow the internal specialist to create a proposal for the non-standard credit. Therefore, at the end of process phase C, the next process phase D has to be assigned to a specialist or specialist department. This is schematically indicated in FIG. 7 by arrow 22 which indicates that the case is forwarded to an inbox 23 of a specialist employee or specialist department. At this point of the process, workload balancing can be applied, i.e. sending the case to an employee of a specialist department on the basis of workload within the department.

The employee that finds the case in his inbox 23 clicks on the case resulting in his computer becoming input channel 12 of the system through which the business process start service 14 starts the control point handler 5 to continue with the process. The control point handler 5 checks the status of the process in the case database 6 and finds out that the status is "process phase C completed". Thereafter, the control point handler 5 calls the process definition database to obtain information on the next process phase D and starts process phase D as indicated by arrow 24 in FIG. 8. presenting a first screen of this process phase D on the screen of input channel 12, i.e. the computer of the employee who found the case in his inbox 23. As in other process phases, information gathered during the process phase D is logged in the entry database 7. When process phase D is completed, the control is returned (indicated by arrow 25) to the control point handler 5 which updates the process status in the case database 6. Thereafter, the control point handler 5 stops and returns control to the interface module 13. In this manner the customer can decide if, when and through which channel 8 he will sign the offer of the non-standard credit.

Figure 9:
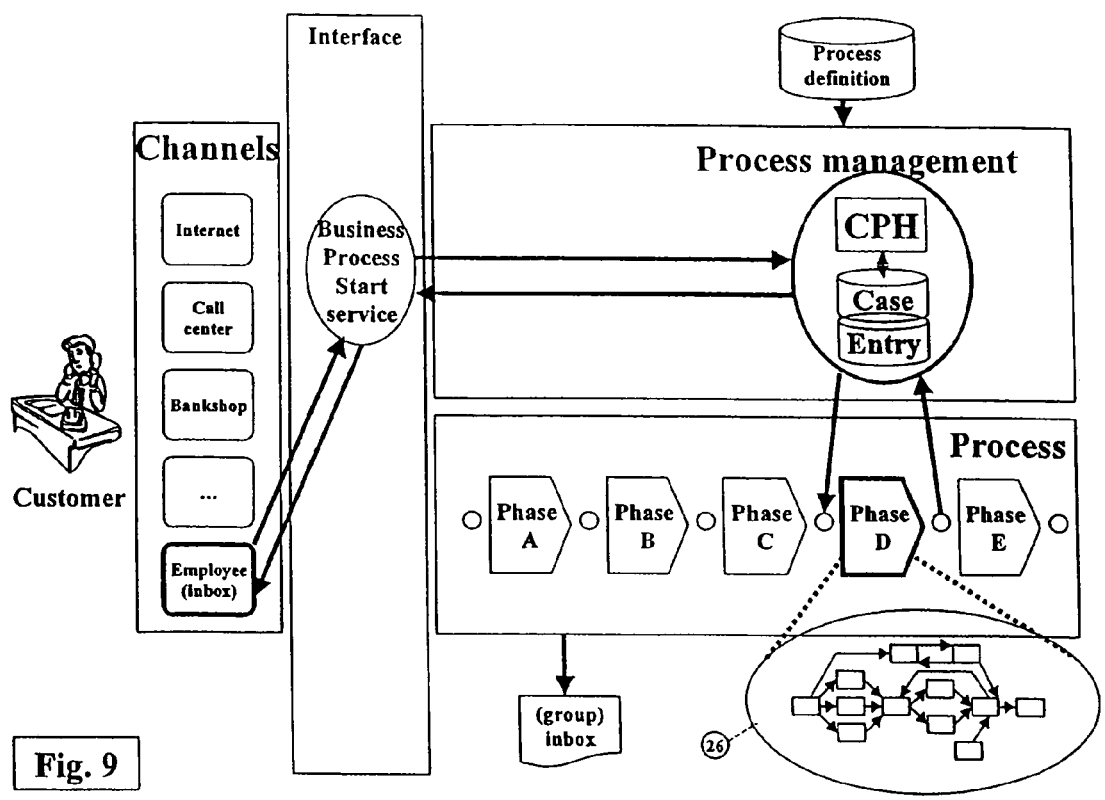
Figure 10:
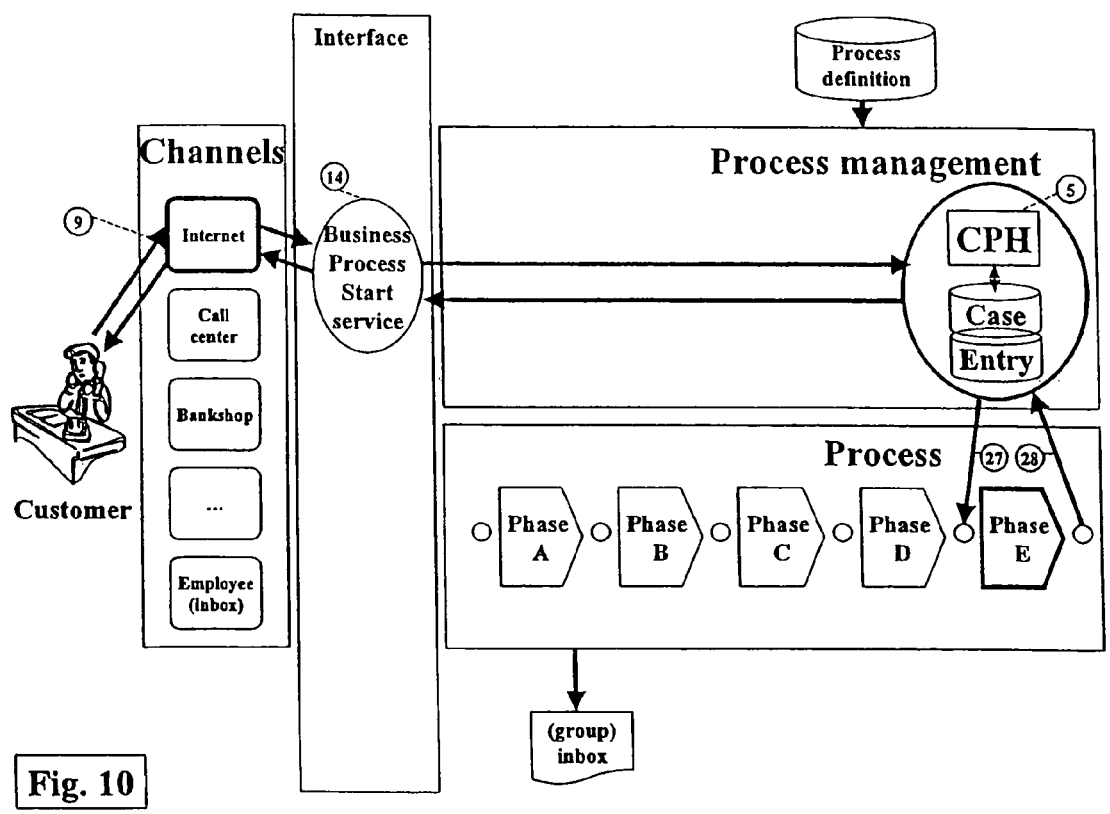

As schematically shown in FIG. 9, process phase D may include a complex workflow mechanism 26 which can managed in a manner known per se, as long as control of the process at the end of process phase D is returned to the control point handler 5.

In the example described the customer chooses to sign the offer for a non-standard credit through the Internet. Using his PC or another suitable terminal adapted to communicate through the Internet, he logs on on the website of the bank operating the described system. By logging on, his PC becomes one of the input channels 8 connected to the system through the Internet channel 9. By clicking on his screen on his personal page, the interface module 13, in particular the business process starts service 14 is called and starts the control point handler 5. As in the previous process phases A-D, the control point handler 5 checks the status of the case in the case database 6 and retrieves from the process definition database 17 the required information on the next process phase E. The control point handler 5 starts up the next process phase E as indicated by the arrow 27 in FIG. 10. Process phase E communicates via the Internet with the customer to obtain his signature of the offer of the non-standard credit. When the customer has signed the offer, he clicks the option "OK and continue" and the control is returned from process phase E to the control point handler 5 as indicated by an arrow 28 in FIG. 10. As in the previous process phases A-D, the control point handler 5 updates the status of the case in the case database 6. Any relevant data has been entered in the entry database 7 during prosecution of the process phase. The control point handler 5 checks with the process definition database 17 the next process phase for this case and learns that the process has been completed.

Figure 11:
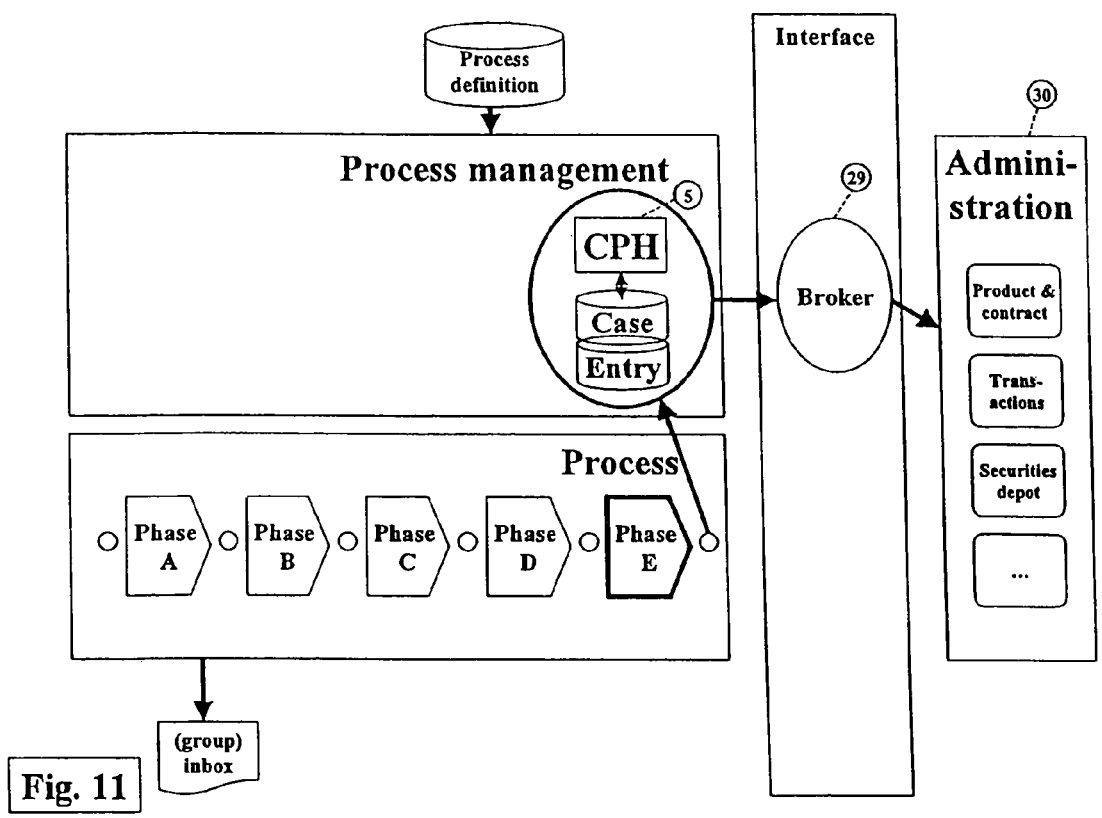
Figure 12:
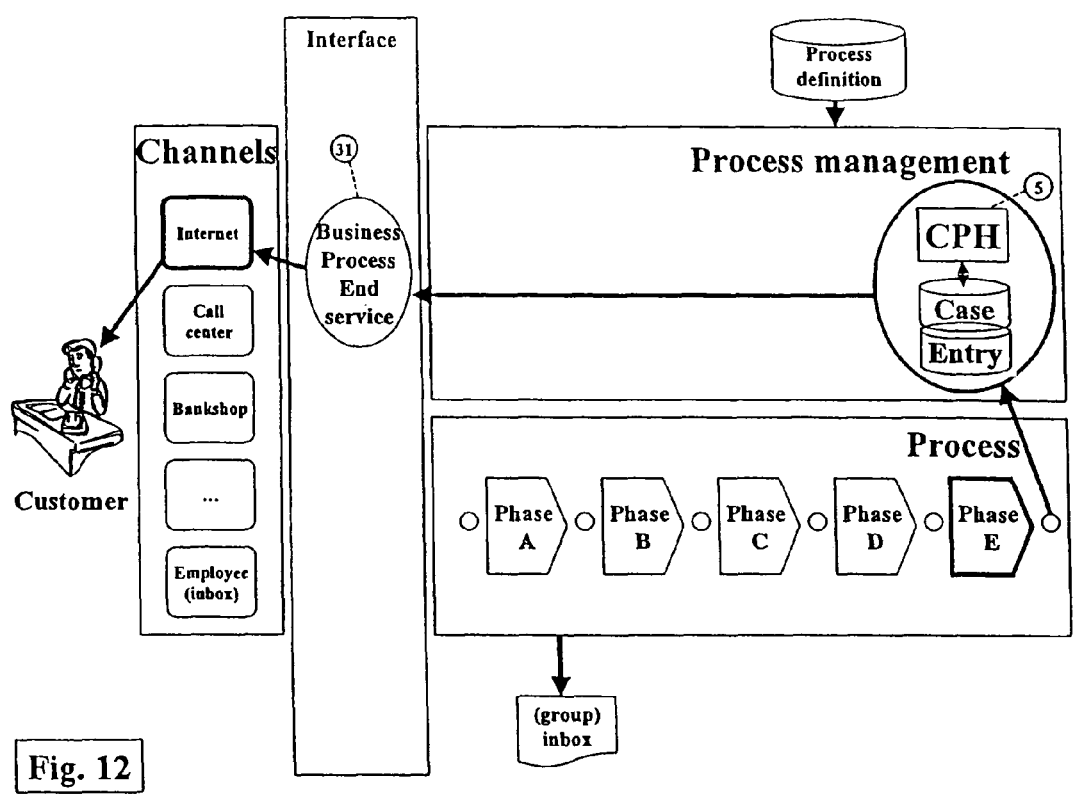

As shown in FIG. 11, completion of a process results in the control point handler 5 starting a broker module 29 which is operable to log the information stored in the entry database 7 regarding the completed process in a central administration system 30. After logging the information stored in the entry database 7 in the central administration system 30, the control point handler 5 calls a business process end service 31 which presents a next screen on the input channel 8 which was used to complete the process. In the example described, this is the monitor screen of the PC of the customer through which he contacted the website of the bank operating the system described. This next screen can be a so-called "further wishes screen". When the customer indicates that he has further wishes, this may lead to a next process managed by the system described.

As shown in FIG. 1, the system comprises a process monitor module 32 for checking the status of open cases in the case database 6. To this end the process monitor module 32 checks for example twice a day the list of open cases stored in the case database 6. It retrieves the status of each open case from the case database 6 and checks with the process definition database 17 whether or not the process is overdue. In case a process is overdue, a notification is sent to the inbox 33 of the responsible person and/or department. This implies a time input to the process monitor module 32. This time input can originate from different sources. For example, the time a process phase may take can be defined in the process definition database 17. As an alternative, the due time for a process phase can be determined by the customer or other outside circumstances. For example, a customer negotiating a mortgage can indicate the time he wants to have the money deposited at the notary. Such time inputs provided by a customer or dependent on other outside circumstances may be updated on line in a different database, wherein the control point handler 5 connects the process phase with the due time entered in this database.

The process monitor module 32 monitors the action taken on the notification sent to the inbox 33. If no action is taken within a predetermined time, the process monitor module 32 will send an alarm message to an inbox not shown of the department manager.

As explained above, process phases can be performed automatically, manually, partly manually, or a process phase can even be a complicated workflow. In any case, all functions and data that are used in a process phase and that are the same for more than one process phase and/or for more than one input channel 8 can be defined and implemented generically. This is schematically shown in FIG. 1 as service modules 34 and 35. Each process phase A-E requiring a function or data, can call the service module 34 and/or 35.

As explained above, when a process phase A-E is completed, the control of the system is returned to the control point handler 5. Each time the control is returned after completion of a process phase, the control point handler 5 updates the status of the process in the case database 6. Further, the control point handler also sends process information to a management information system 36.

From the above description it will be understood that according to the invention the system for managing a number of business processes is arranged in such a manner that the customer has control over the time and input channel through which a process is started, stopped and resumed. To this end the control point handler 5 operates according to a pull mechanism, wherein the customer indicates his wish to start a first or next process phase of a desired business process. The control point handler 5 is operable to start the correct process phase A-E by calling the process definition database 17 and starting the correct process phase. After completion of each process phase A-E control of the process is returned to the control point handler 5 and only if the customer indicates his wish to continue the process, the control point handler 5 starts the next process phase. If the customer wants to wait with continuation of a process, he can do so. He can continue the pending process, i.e. resume the process, through any channel he desires to use. As the status and all relevant data are centrally available in the case database 6 and the entry database 7, the control point handler 5 can start the next process phase with all available information ready for use in the next process phase.

The invention is not restricted to the above-described embodiment which can be varied in a number of ways within the scope of the claims.

What is claimed is:

1. A system for managing business processes through a plurality of distinct input channels, said processes having a number of consecutive process phases, said system comprising:

a plurality of distinct input channels, wherein at least one of the input channels comprises a computing device, the plurality of input channels for selection and performance of customer service, and wherein through any of the plurality of input channels, one or more of said processes in their current state are operable to be started, continued, stopped, and accessed by a customer;

a process management module configured to start upon receipt of a request from the customer, said request starting an application program for executing steps as defined in a predetermined process phase associated with a selected one of said input channels;

a process definition database comprising process definitions of each of said number of processes, each process definition comprising the process phases, wherein each process phase is associated with a particular one of said input channels, and an order of process phases to be executed to complete the business process; and an interface module handling communication between the input channels and the process management module, the interface module comprising a session service for storing session information about a particular one of the plurality of input channels through which a given request for executing a process phase was received;

wherein the process management module comprises a control point handler for starting the application program for executing the steps in the process phase identified in said request, a case database for storing the status of each process managed by the system, and an entry database for storing data gathered during execution of the process, and wherein the process management module is configured to:

receive a request from the customer for the execution of a predetermined process phase through a first input channel selected from the plurality of input channels, the control point handler retrieving session information about the first input channel through which the request was made by said customer and using the session information for retrieving the requested process phase associated with the first input channel through which the process was accessed from the process definition database and to start the prosecution of the retrieved process phase, wherein said requested process phase is associated with a process phase implementation which is suitable for use on the first input channel through which said process is accessed by said customer, to store data entered during prosecution of a process phase in the entry database and retrieving data stored in the entry database which is to be used during execution of a retrieved process step, from the entry database, and to return the control of the process to the control point handler after completion of the prosecution of each process phase, wherein after the return of the control of the process, the control point handler is operable to update the status of the respective process in the case database, the process management module further operable to determine that a continuation request from the customer is received through a second one of said plurality of input channels, wherein the second input channel can be the same as or different from the first input channel, and when received, to retrieve session information about the second input channel through which the continuation request was made by said customer, to retrieve the next requested process phase associated with the second input channel through which the continuation request was made from the process definition database, and to start prosecution thereof, and the process management module further operable to determine that a stop request from said customer is received through a third one of said plurality of input channels, wherein the third input channel can be the same as or different from the first and second input channels, and when received, the control point handler is operable to return control to the interface module.

2. The system according to claim 1, wherein a process phase is completed by an OK command including either the continuation request or the stop request, wherein the OK command returns the control of the process to the control point handler, and wherein the continuation request instructs the control point handler to start the next process phase of the process and the stop request instructs the control point handler to return control to the interface module.

3. The system according to claim 2, comprising a client view function configured to provide customer information including information on open cases, and wherein an open case can be started in the client view function through the interface module.

4. The system according to claim 1, wherein one or more process phases includes forwarding a message presenting the process to an inbox of a customer service employee to be involved in the process, wherein the process is operable to be started from the inbox message through the interface module, and wherein starting the process starts the control point handler to check the status of the process by means of the case database and to retrieve the next process phase from the process definition database in order to start the next process phase using the computer of said customer service employee as an input channel, wherein after completion of said next process phase control is returned to the control point handler to update the status of the process in the case database, whereafter the control point handler returns control to the interface module.

5. The system according to claim 4, wherein said one or more process phases comprises a workflow process.

6. The system according to claim 1, wherein after completion of the last process phase of a process the control point handler starts a broker interface to log the data stored in the entry database in a central administration system.

7. The system according to claim 6, comprising a business process end service module, wherein after logging the information in the central administration, the control point handler starts the business process end service module.

8. The system according to claim 1, wherein a process monitor module is provided for checking the status of open cases in the case database by means of a time input, and wherein the process monitor module sends a notification to an inbox of a person indicating that the process phase is overdue.

9. The system according to claim 8, wherein the process definition database comprises information on the time a process phase may take, which information is used as time input by the process monitor.

10. The system according to claim 8, wherein the customer can set a time input the process phase may take.

11. The system according to claim 8, wherein the process monitor module monitors the action taken on the notification sent, wherein an alarm message is sent to a further inbox if no action is taken within a predetermined time.

12. The system according to claim 1, comprising a service module configured to provide process functions and data, which service module can be called by a process phase to deliver a process function and/or data.

13. The system according to claim 1, wherein the control point handler is configured to send process information to a management information system when control of the process is returned after completion of a process phase.

* * * * *